US012554299B2

(12) United States Patent
Baumgarte et al.

(10) Patent No.: US 12,554,299 B2
(45) Date of Patent: Feb. 17, 2026

(54) PLUMBING FIXTURE WITH POWER AND COMMUNICATION SYSTEM

(71) Applicant: Delta Faucet Company, Indianapolis, IN (US)

(72) Inventors: Joseph Wayne Baumgarte, Carmel, IN (US); Raul Tueme, Carmel, IN (US)

(73) Assignee: Delta Faucet Company, Indianapolis, IN (US)

( * ) Notice: Subject to any disclaimer, the term of this patent is extended or adjusted under 35 U.S.C. 154(b) by 133 days.

(21) Appl. No.: 18/637,072

(22) Filed: Apr. 16, 2024

(65) Prior Publication Data

US 2024/0353902 A1 Oct. 24, 2024

Related U.S. Application Data

(60) Provisional application No. 63/497,860, filed on Apr. 24, 2023.

(51) Int. Cl.
*G06F 1/18* (2006.01)
*A47K 3/28* (2006.01)
*E03C 1/182* (2006.01)

(52) U.S. Cl.
CPC ............. *G06F 1/189* (2013.01); *A47K 3/281* (2013.01); *E03C 1/182* (2013.01); *E03C 2201/00* (2013.01)

(58) Field of Classification Search
CPC ......... G06F 1/189; A47K 3/281; E03C 1/182; E03C 2201/00; E03C 1/0408; E03C 1/057
See application file for complete search history.

(56) References Cited

U.S. PATENT DOCUMENTS 8,639,391 B1 1/2014 Alberth et al.
10,021,801 B2 7/2018 Deros
10,407,884 B2 9/2019 Hirsch
(Continued)

OTHER PUBLICATIONS

Koo; An Internet-of-Things (IoT) system development and implementation for bathroom safety enhancement; Dec. 31, 2016; https://www.sciencedirect.com/science/article/pii/S187770581630008X, 8 pages.

(Continued)

*Primary Examiner* — An T Nguyen
(74) *Attorney, Agent, or Firm* — Bose McKinney & Evans LLP

(57) ABSTRACT

A power and communications system associated with a plumbing fixture and which is connected with an external electrical power source. The system includes a power and communication assembly having electrical circuitry adapted to be electrically connected with the external electrical power source and provide electrical power to the power and communication assembly. The electrical circuitry can also be coupled with a plurality of peripheral devices. The power and communication assembly includes a transceiver in communication with the electrical circuitry and adapted to transmit and receive messages with an external communication network and a communication router in communication with the transceiver and adapted to be communicatively coupled with the plurality of peripheral devices. The plumbing fixture is coupled with the power and communication assembly and is adapted to be operably coupled with the plurality of peripheral devices. The plumbing fixture may take the form of a sink or a shower panel.

32 Claims, 7 Drawing Sheets

(56) References Cited

U.S. PATENT DOCUMENTS

| | | | |
|---|---|---|---|
| 10,472,252 B2 | 11/2019 | Schuster | |
| 10,663,938 B2 | 5/2020 | Rexach et al. | |
| 11,093,554 B2 | 8/2021 | Rexach et al. | |
| 11,099,540 B2 | 8/2021 | Bradley et al. | |
| 11,779,515 B2* | 10/2023 | Urfig | A61H 33/067 4/535 |
| 2014/0248802 A1 | 9/2014 | Hieda et al. | |
| 2016/0103441 A1 | 4/2016 | DeVries | |
| 2019/0270630 A1 | 9/2019 | Dahan et al. | |
| 2020/0299941 A1 | 9/2020 | Veros et al. | |
| 2021/0309539 A1 | 10/2021 | Budampati et al. | |
| 2021/0324828 A1* | 10/2021 | Williams | F03B 13/00 |
| 2022/0049867 A1* | 2/2022 | Rexach | F24F 7/003 |
| 2022/0316190 A1 | 10/2022 | Connolly et al. | |

OTHER PUBLICATIONS

Glowacki, Kohler Adds Stillness Bath, Intelligent Toilet, Touchless Faucet to Smart Home Line; Jan. 11, 2021; https://restechtoday.com/kohler-enhances-smart-home-collection-with-stillness-bath-intelligent-toilet-touchless-bathroom-faucet/, 4 pages.

Sharif; Smart Home Automation by Internet-of-Things Edge Computing Platform; Jul. 5, 2022; https://pdfs.semanticscholar.org/79e1/c09b9f4cae1807f9887e0eb76af9d3ab1349.pdf?_ga=2.11030833.425651074.1668619024-322679993.1666883774, 11 pages.

Lekach; The Internet of Things now includes everything and the kitchen sink; Jan. 5, 2018; https://mashable.com/article/iot-voice-control-delta-faucet-sink, 10 pages.

Carlin; Everything including the kitchen sink: securing the Internet of Things; Jun. 13, 2022; https://www.software.ac.uk/blog/2022-06-13-everything-including-kitchen-sink-securing-internet-things, 3 pages.

\* cited by examiner

PLUMBING FIXTURE WITH POWER AND COMMUNICATION SYSTEM

CROSS-REFERENCE TO RELATED APPLICATION

This application claims priority under 35 U.S.C. 119(e) from U.S. Provisional Patent Application Ser. No. 63/497,860 filed on Apr. 24, 2023 and entitled PLUMBING FIXTURE WITH POWER AND COMMUNICATION SYSTEM, the disclosure of which is hereby incorporated herein by reference.

BACKGROUND

Many modern plumbing fixtures incorporate devices that require electrical power and/or control signals. For example, a bathroom sink might include a proximity sensor and an electronically controlled valve that is opened and closed in response to signals originating from the proximity sensor. A kitchen sink might also include one or more electronically controlled valves which are opened and closed in response to control signals. Similarly, showers may also include electronically controlled valves and other devices requiring electrical power or control signals. Many of the devices that provide these features are also capable of communicating with a computer network.

When a plumbing fixture includes a plurality of such devices, there is often a multiplicity of parts. For example, each device might include a transceiver for communicating with a wireless computer network that is connected to the internet whereby each device may route its signals through this wireless network to a server on the internet, i.e., cloud-based communications, when communicating with other devices.

SUMMARY

The present disclosure describes a power and communication system that can be employed with a plumbing fixture and facilitates the use of peripheral devices.

In some embodiments, the system can reduce some of the multiplication of parts found in existing systems. Some embodiments of the system may also simplify communication between the different components of the system.

The disclosure describes a power and communications system for use with an external electrical power source wherein the system includes a power and communication assembly; the power and communication assembly including electrical circuitry adapted to be electrically connected with the external electrical power source and provide electrical power to the power and communication assembly, the electrical circuitry further adapted to be coupled with a plurality of peripheral devices; a transceiver in communication with the electrical circuitry and adapted to transmit and receive messages with an external communication network; and a communication router in communication with the transceiver and adapted to be communicatively coupled with the plurality of peripheral devices; and wherein the system further includes a plumbing fixture coupled with the power and communication assembly and adapted to be operably coupled with the plurality of peripheral devices.

In some embodiments of the system, the system further includes one or more electronically controlled valves coupled with the plumbing fixture and forming one or more of the peripheral devices.

In some embodiments of the system, the electrical circuitry further includes at least one communication port in communication with the communication router, the at least one communication port being connectable with one of the plurality of peripheral devices.

In some embodiments of the system, the electrical circuitry includes a plurality of power and communication ports wherein each of the plurality of power and communication ports is adapted to supply DC electrical power to a connected peripheral device and communicate electrical signals between the communication router and the connected peripheral device.

In some embodiments of the system including a plurality of power and communication ports, the plurality of power and communication ports include at least one USB-C port and/or at least one Power over Ethernet (PoE) port. The electrical circuitry may also further include an AC power outlet adapted to supply AC electrical current to a peripheral device. For example, the plumbing fixture may be a sink with the AC power outlet being positioned below the sink whereby the AC power outlet is adapted to power a device coupled with the sink such as a garbage disposal, reverse osmosis filter or other device requiring AC power.

In some embodiments of the system, wherein the plumbing fixture is a sink and the electrical circuitry includes an AC power outlet positioned below the sink, the electrical circuitry may also include an electronically controlled switch whereby the AC power outlet is selectively energized in response to control signals communicated through the communication router.

In some embodiments of the system, the plumbing fixture is a shower panel and the plurality of peripheral devices includes a wireless charging pad mounted on the shower panel and/or user-actuated microphone mounted on the shower panel and a speaker mounted on the shower panel.

In some embodiments of the system, the plumbing fixture is a shower panel and the electrical circuitry includes a plurality of power and communication ports wherein each of the plurality of power and communication ports is adapted to supply DC electrical power to a connected peripheral device and communicate electrical signals between the communication router and the connected peripheral device. In some embodiments, the plurality of power and communication ports include at least one USB-C port and/or at least one Power over Ethernet (PoE) port.

In some embodiments of the system, the system is capable of communicating signals between the external communication network and each of the peripheral devices through the transceiver and communication router and the system is also capable of directly communicating signals between separate ones of the plurality of peripheral devices through the communication router without the signals being communicated through any external communication network.

The disclosure also describes a plumbing fixture adapted to be coupled with an existing electrical power source wherein the plumbing fixture includes electrical circuitry adapted to be electrically connected with the existing electrical power source and provide electrical power to a power and communication assembly, the electrical circuitry further adapted to provide electrical power to a plurality of peripheral devices; the power and communication assembly including a transceiver adapted to transmit and receive messages with an external communication network; and a communication router in communication with the transceiver and adapted to be communicatively coupled with the plurality of peripheral devices.

In some embodiments, the plumbing fixture is a shower panel and the plurality of peripheral devices includes a user-actuated microphone mounted on the shower panel and a speaker mounted on the shower panel.

In some embodiments, the plumbing fixture is a shower panel and the plurality of peripheral devices includes a wireless charging pad mounted on the shower panel.

In some embodiments of the plumbing fixture, the electrical circuitry includes an AC to DC converter and a plurality of power and communication ports wherein each of the plurality of power and communication ports is adapted to supply DC electrical power to a connected peripheral device and communicate electrical signals between the communication router and the connected peripheral device. In such embodiments, the transceiver and the communication router may be disposed in a central housing with the plurality of power and communication ports being positioned remote from the central housing and wherein the electrical circuitry comprises wiring fixed to the plumbing fixture and extending between the central housing and the plurality of power and communication ports and communicating DC power and electrical signals therebetween.

In some embodiments of the plumbing fixture, the power and communication assembly is capable of communicating signals between the external communication network and each of the peripheral devices through the transceiver and the communication router and the power and communication assembly is also capable of directly communicating signals between separate ones of the plurality of peripheral devices through the communication router.

In some embodiments of the plumbing fixture having a plurality of power and communication ports, at least one of the plurality of power and communication ports is positioned at a mounting location of a corresponding one of the plurality of peripheral devices.

In some embodiments of the plumbing fixture having a plurality of power and communication ports, each of the plurality of power and communication ports is positioned at a mounting location of a corresponding one of the plurality of peripheral devices.

In some embodiments of the plumbing fixture having a plurality of power and communication ports, the plurality of peripheral devices includes at least two devices from the group consisting of an electronically controlled valve, an electronically controlled drain, an electronically controlled power switch, an automated soap dispenser, a proximity sensor, a user-actuated microphone, a speaker, and a wireless charging pad. In such an embodiment, the plurality of peripheral devices may each be connected with a respective one of the plurality of power and communication ports. In such embodiments, the plurality of power and communication ports may include at least one USB-C port and/or at least one Power over Ethernet (PoE) port.

In the various embodiments, the plumbing fixture may be a shower panel or a sink.

In those embodiments wherein the plumbing fixture is a sink, the electrical circuitry may include an AC power outlet positioned below the sink whereby the AC power outlet is adapted to power a device coupled with the sink such as a garbage disposal, reverse osmosis filter or other device requiring AC power. In such an embodiment, the electrical circuitry may include an electronically controlled switch whereby the AC power outlet is selectively energized in response to control signals communicated through the communication router.

The disclosure also describes a shower panel that includes a sheet of water resistant material defining at least one wall of a shower enclosure and a wireless charging pad mounted on the sheet of water resistant material whereby a device having a re-chargeable battery can be recharged with the wireless charging pad. In some embodiments, the shower panel includes a horizontal support and the wireless charging pad is mounted at the horizontal support whereby the device having a re-chargeable battery, such as a mobile phone, can be re-charged when positioned on the horizontal support.

The disclosure also describes a shower panel that includes a sheet of water resistant material defining at least one wall of a shower enclosure; a user-actuated switch mounted on the sheet of water resistant material; a speaker mounted on the sheet of water resistant material; and a microphone mounted on the sheet of water resistant material and operably coupled with the user-actuated switch whereby a user can selectively activate the microphone.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein.

Figure 1:
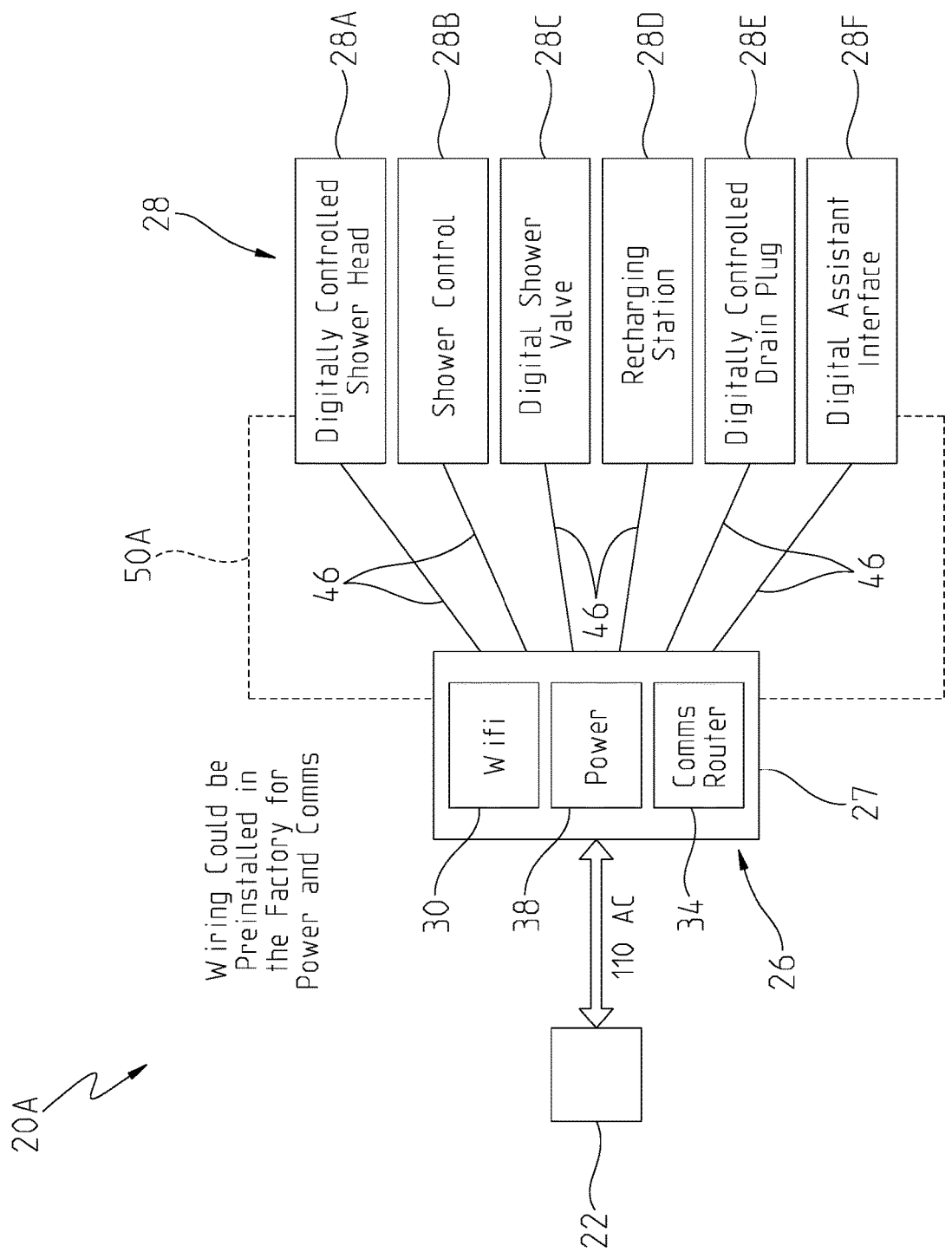
FIG. 1 is a schematic view of one embodiment of a power and communication system used with a plumbing fixture.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

Figure 2:
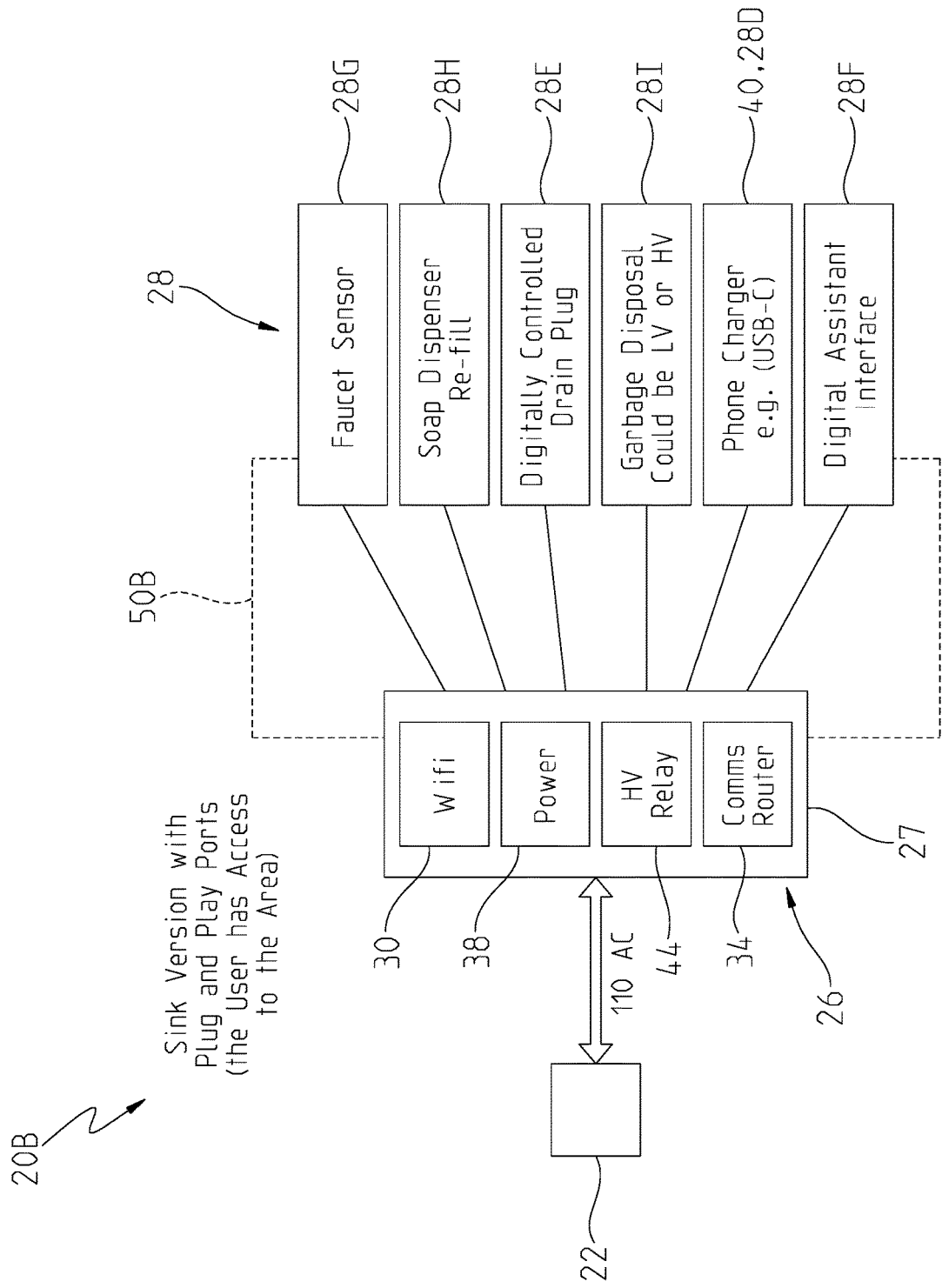
FIG. 2 is a schematic view of another embodiment of a power and communication system used with a plumbing fixture.
Figure 4:
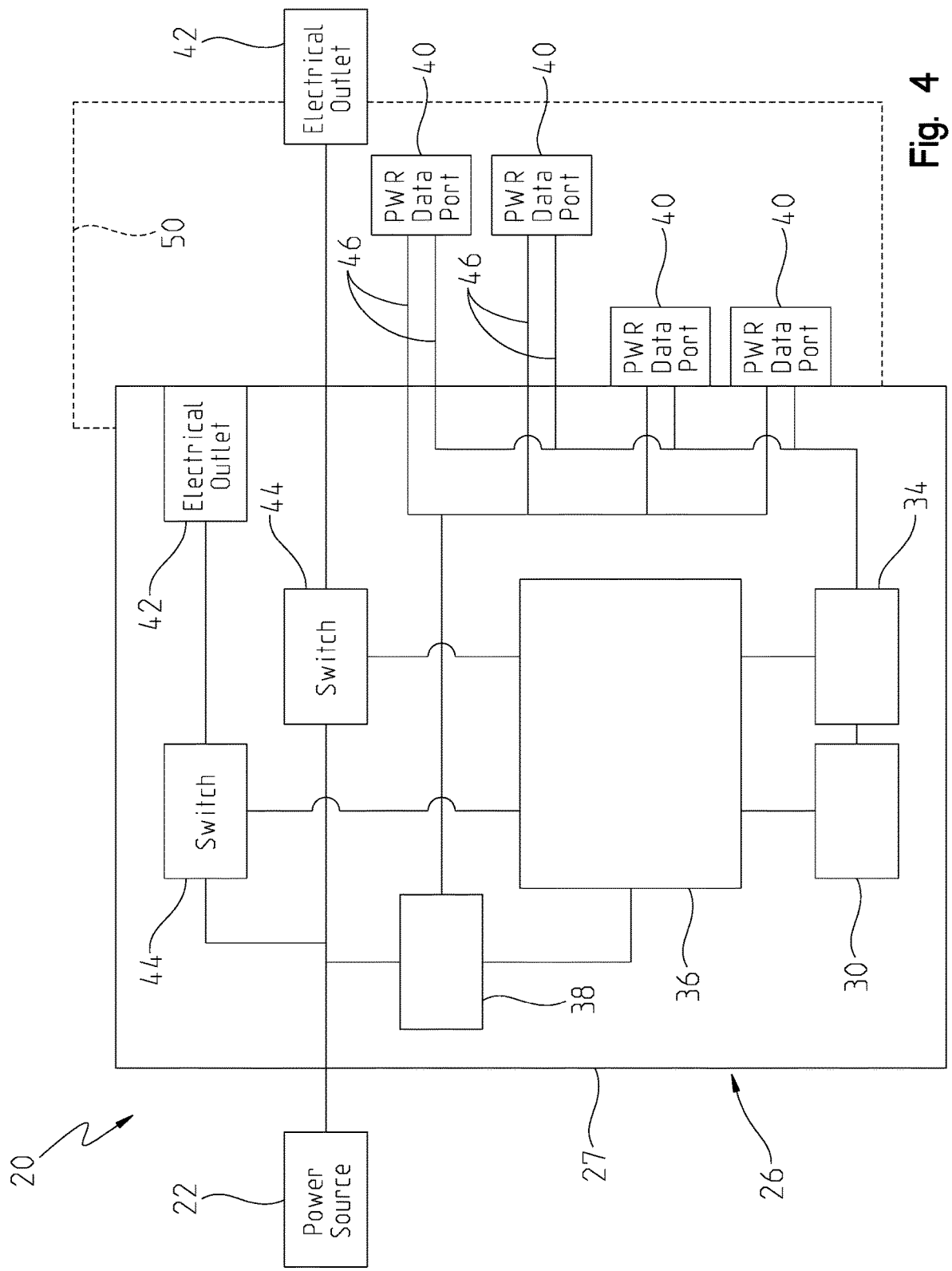
FIG. 4 is another schematic view of a power and communication system.
Figure 5:
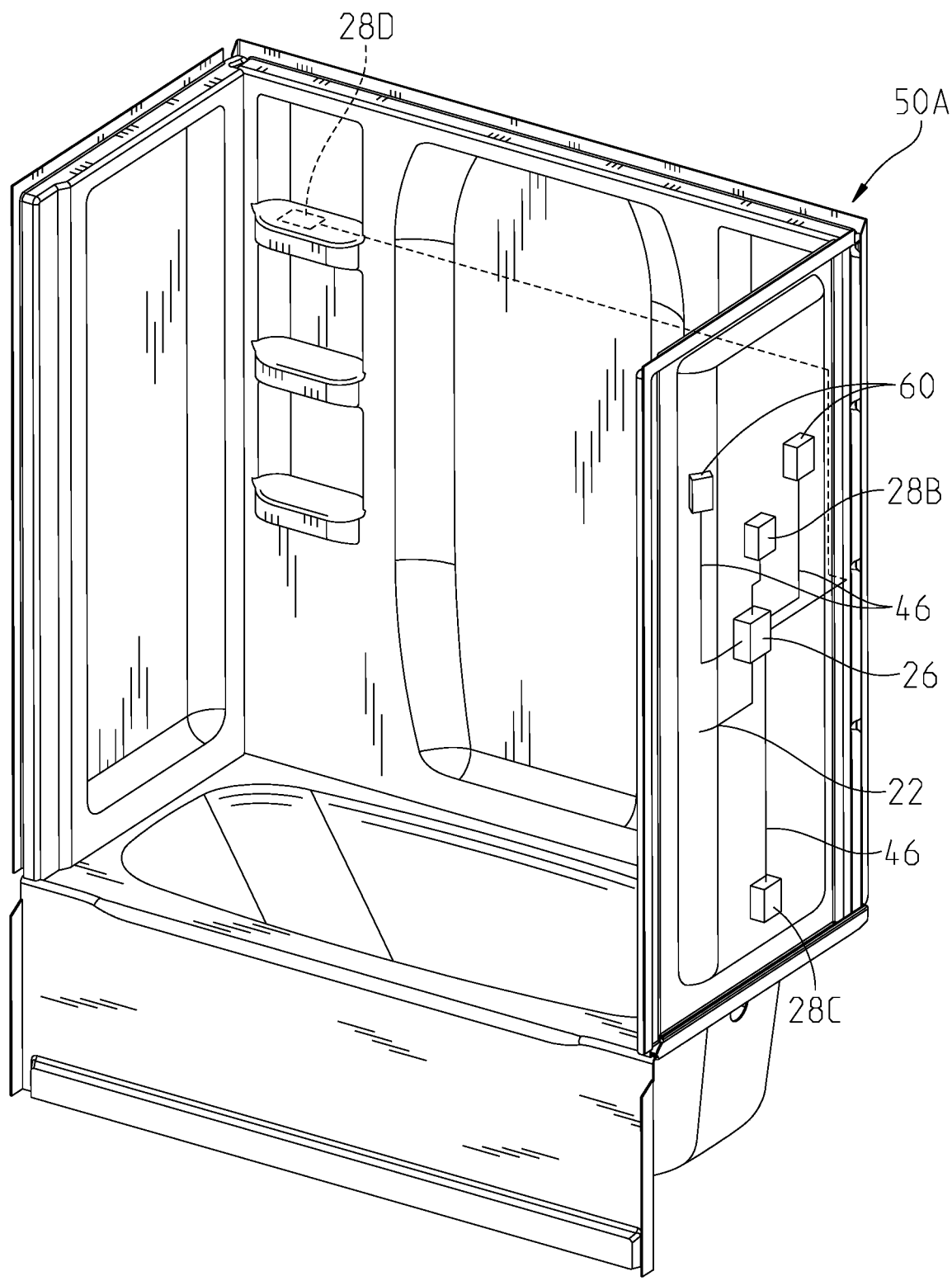
FIG. 5 is a view of a power and communication system integrated with a shower panel.

A power and communication system 20, 20A, 20B for use with an external power supply 22 is schematically depicted in FIGS. 1, 2 and 4. The system 20A depicted in FIG. 1 is used with a plumbing fixture in the form of a shower panel 24. System 20 includes a power and communication assembly 26 and a plurality of peripheral devices 28. In the embodiment of FIG. 1, the peripheral devices include an electronically controlled shower head 28A, an electronic shower control 28B that provides an interface for user input to control the operation of the shower, a digitally controlled shower valve 28C, an inductive charging pad 28D for wirelessly recharging a battery such as a rechargeable mobile phone battery, an electronically controlled drain plug 28E and a digital assistant interface 28F.

Power and communication assembly 26 is shown in a simplified form in FIGS. 1 and 2 while FIG. 4 provides a more detailed schematic view. In the illustrated embodiments, the power and communication assembly takes the form of a central hub having a housing with the various components of the assembly 26 mounted therein. While the use of a central housing for assembly 26 will often be desirable, assembly 26 can also be formed by components located in separate housings or without a housing where those separate components are located at a distance from each other. For example, such a spatially distributed arrangement might be necessary due to the spatial constraints of the plumbing fixture or for other design considerations.

In FIGS. 1, 2 and 4, a plumbing fixture 50, 50A, 50B is coupled with the power and communication assembly 26. The plumbing fixture 50, 50A, 50B is also operably coupled with the plurality of peripheral devices 28. In FIG. 1, plumbing fixture 50A is a shower panel while in FIG. 2, plumbing fixture 50B is a sink.

The illustrated assembly/central hub 26 of FIG. 4 includes a transceiver 30, a communications router 34, a processor 36, a rectifier and voltage converter 38, a plurality of power and communication ports 40, AC electrical power outlets 42 and digitally controlled switches 44 in the electrical lines supplying outlets 42.

Transceiver 30 can transmit and receive wireless signals or messages with an external communication network 32 such a wireless router having an internet connection in a residential household commonly referred to as wifi or a wifi network. Communication router 34 routes communication and control signals between the transceiver and the plurality of peripheral devices 28. When routing control signals between two peripheral devices, the control signals may be advantageously routed from one device to the other device through the communications router 34 without being transmitted to an external communication network by transceiver 30. Processor 36 is programmed to control the operation of the various components of the system.

Rectifier and voltage converter 38 converts AC electrical power from an external power supply, e.g., the electrical wiring or mains within a household or business, to DC power at a lower voltage that can be utilized by the various components of the system. Low voltage DC power is also supplied to peripheral devices 28 through power and communication ports 40. Ports 40 also communicate electrical signals between communication router 34 and peripheral devices for conveying information, e.g., control signals and sensor data. Ports 40 may take various forms such as USB-C ports or Power over Ethernet (PoE) ports. The ports 40 may be mounted on the housing 27 of assembly 26 or at the end of external cabling 46 extending from assembly 26 and at or proximate the location of one of the peripheral devices.

Electrical power is also routed from the external power source 22 to conventional AC power outlets 42. AC power outlets 42 may be mounted on the housing 27 of assembly 26 or external cables 48 may convey the electrical current to a power outlet 42 located remote from assembly 26. This allows the assembly 26 to act as a UL (Underwriters Laboratories) rated power strip or extension cord. The provision of one or more power outlets 42 can be particularly advantageous when the plumbing fixture is a kitchen sink. Many garbage disposals used with kitchen sinks have an electrical cord and plug for engaging a conventional AC power outlet to provide the necessary electrical power to operate the garbage disposal. The power outlets 42 provided by system 20 would allow a garbage disposal 28I to be mounted below the drain of the sink and plugged into an outlet 42 of assembly 26. Digitally controlled switches 44 can be located in the electrical lines supplying each of the outlets 42 whereby electrical power may be selectively provided to each outlet 42. For example, a touch sensitive sensor 28J can be provided as one of the peripheral devices 28 and be used to control the electrical power to one of the outlets 42 whereby the device plugged into the outlet can be turned on and off using the touch sensitive switch. When using multiple outlets 42, each outlet could be provided with a separate switching mechanism or the switching mechanism could have the ability to select which power outlet 42 to control whereby each outlet 42 could be independently energized and de-energized. Alternatively, one or more outlets 42 could be provided that are not switched but always energized.

Whether or not it will be advantageous to provide a switched outlet or a continuously energized outlet will depend, in part, on the anticipated uses for the outlet. Some of the devices which may be advantageously used with such outlets include, among other devices, garbage disposals and reverse osmosis filters. In this regard, it will generally be desirable to use a switched outlet with a garbage disposal and an un-switched outlet with a reverse osmosis filter.

Returning to FIG. 1, this figure schematically depicts a system 20 having a plumbing fixture in the form of a shower panel 50A. Power and communications assembly 26 is shown in a simplified manner and an external electrical power source 22 supplies it with 110 volt AC electrical current as is commonly found in households and other structures. Assembly 26 is mounted on shower panel 50A and cabling 46 extends from assembly 26 to the location of peripheral devices 28A-28F. Ports 40 are located at the end of cabling 46 whereby a peripheral device may be coupled with assembly 26 by connecting it to the port 40. Cabling 46 conveys both communication signals, e.g., control signals and sensor data, between assembly 26 and the peripheral device and also supplies low voltage electrical current to the peripheral device to thereby provide the device with the electrical power needed for its operation.

Several peripheral devices 28 are shown coupled to shower panel 50A and assembly 26 in FIG. 1. More specifically, a digitally controlled shower head 28A, an electronic shower control 28B, a digitally controlled shower valve 28C, an inductive coil charging station 28D, a digitally controlled drain plug 28E and a digital assistant interface 28F. The shower control 28B may take the form of a touch screen or other suitable interface for receiving user input whereby a user can control the various peripheral devices. For example, the user may turn the shower on and off and adjust the temperature by interacting with shower control 28B. Signals from shower control 28B would then be routed to digitally controlled shower valve 28C through communication router 34 of assembly 26. Similarly, digitally controlled shower head 28A could be controlled by the user via shower control 28B, e.g., a pulsating shower flow could be changed to a non-pulsating flow of water, or, instead of directing water to the shower head, water could be directed toward a separate faucet for filling a bathtub. The shower control 28B could also be used to open and close a digitally controlled drain plug 28E when filling or emptying a bathtub associated with the shower panel.

Inductive coil charging station 28D can be used to charge a rechargeable battery. For example, charging station 28D may be disposed in a horizontal support surface 52 in shower panel 50A whereby a mobile phone or similar device could be positioned on the horizontal support surface 52 and be recharged while the user was taking a shower. Advantageously, the horizontal support surface 52 having the inductive coil associated therewith, would be positioned where it would generally not be impacted by water flow during use of the shower, e.g., near the top of the shower panel.

Figure 7:
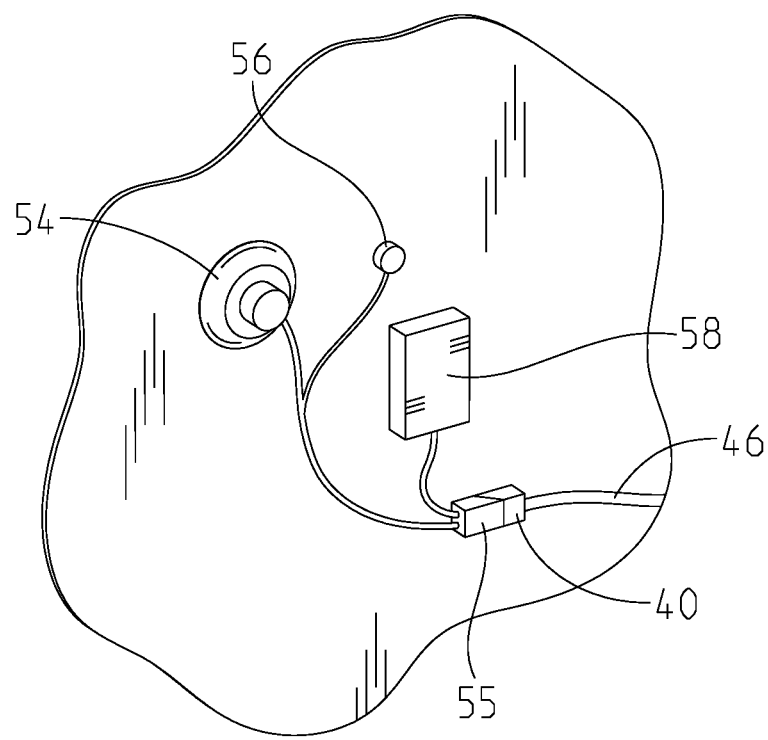
FIG. 7 is a schematic view of a peripheral device mounted on a shower panel.

Shower panel 50A may also be provided with a digital assistant interface 28F. As schematically depicted in FIG. 7, interface 28F includes a speaker 54, microphone 56 and a switching mechanism such as a touch sensitive sensor 58 for activating and deactivating the digital assistant interface 28F. Each of the separate components 54, 56 and 58 might be connected through a separate port 40 to communicate with assembly 26. Alternatively, the digital assistant interface 28F may also include a hub member 55 which connects with a single port 40. The hub member 55 might also include an integrated circuit whereby device 28F has the functionality of a smart speaker. Various alternative embodiments of digital assistant interface 28F may alternatively be employed. Digital assistant interface 28F would allow the user to interact with a digital assistant system that the user is operating in cooperation with a wifi network. For example, transceiver 30 in assembly 26 would allow signals from interface 28F to be communicated with the user's home wifi network and thereby engage with the user's pre-existing digital assistant system, e.g., Amazon's Alexa or Google Assistant. Furthermore, speaker 54 could be used to play music or a radio broadcast while the user was using the shower. In this regard, an alternative peripheral device 28 could consist solely of a speaker 54 to provide such functionalities.

The assembly 26, cabling 46 and ports 40 are advantageously mounted to the shower panel during manufacture of the shower panel. For example, cabling 46 could be permanently secured to the backside of the shower panel or be integrated into the panel when the panel was molded whereby the cable was embedded in the panel. In some embodiments, cabling 46 is capable of being removed from the shower panel, however, in other embodiments, cabling 46 cannot be removed from the shower panel without destroying at least one of the cable 46 or the shower panel 50A.

Advantageously, the wiring 46 attached to shower panel 50A is all low voltage and without any wiring being exposed to to the interior of the shower enclosure to thereby limit the possibility of electrical shock.

For assemblies 26 mounted on a shower panel, some embodiments may not include any ports 40 located on the housing of the assembly 26 with the ports 40 all being located at the locations where a peripheral device is, or could be, installed. The provision of a shower panel 50A with multiple ports 40 located at positions suitable for installation of a peripheral device allow a single shower panel design to be used with a wide variety of different applications. For example, the user may elect to use only a few of the available ports with the remaining ports either being hidden on the backside of the shower panel or covered with a water proof member. Such unused ports will also allow the user to add additional peripheral devices after the shower panel has been installed without having to add additional cabling from the assembly 26 to the location where the peripheral device is being installed.

It is noted that once the shower panel has been installed, the backside of the shower panel where assembly 26 is located will generally not be accessible. Thus, locating ports 40 at the site of the peripheral device instead of on the housing 27 of assembly 26 will be advantageous and provide greater functionality because the ports on the housing 27 will not be readily accessible after installation of the shower panel. Ports 40 on housing 27, however, can be beneficial if it is desirable to limit cabling 46 to the peripheral devices being installed together with the shower panel 50A during the initial installation of the shower panel. Such cabling 46 could also be removably detachable from the shower panel. This provision of one or more ports 40 on housing 27 would also allow a peripheral device coupled with assembly 26 via such ports to be installed at a custom location on the shower panel. In some embodiments, the shower panel may include both wiring permanently affixed to the shower panel having ports 40 at the locations where peripheral devices could be installed and ports 40 located on housing 27 of assembly 26.

Figure 6:
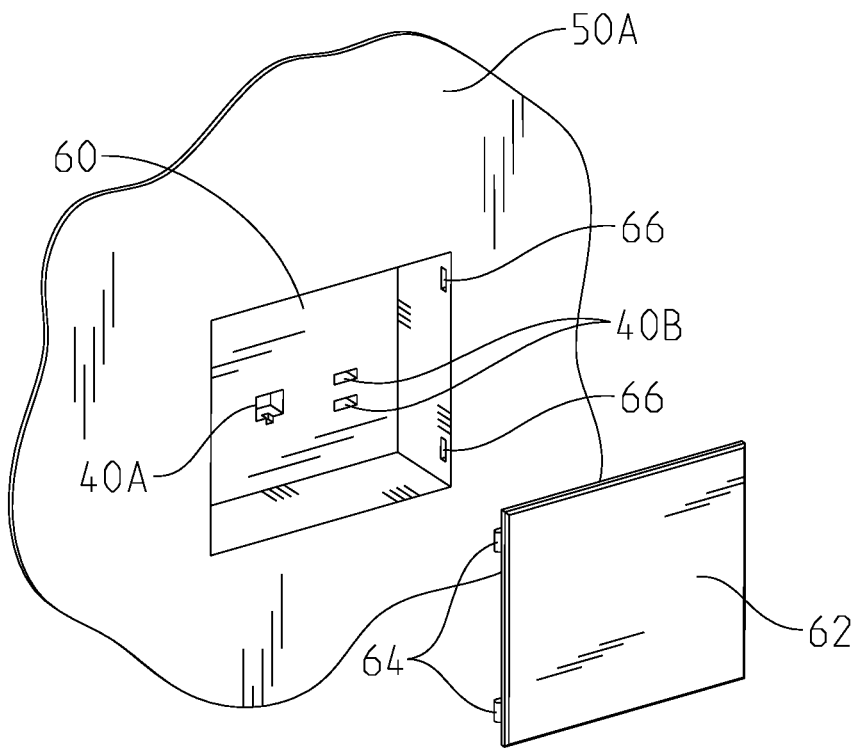
FIG. 6 is a detail view of a shower panel.

This arrangement provides a modular shower system wherein the user can purchase the shower panel 50A and then selectively add peripheral devices 28 to the shower panel 50A before installing the panel and without necessarily installing a peripheral device 28 at all of the potential locations for doing so. In this regard, it is noted that FIG. 6 schematically depicts a peripheral device receptacle 60 that can be formed in the shower panel 50A. The receptacle 60 includes one or more ports 40 which are connected to assembly 26 via cabling 46. A water tight cover 62 may be used to cover receptacle 60 if the user chooses not to install a peripheral device at the location of receptacle 60. Sealing members around the periphery of cover 62 may be used to prevent the ingress of water into the receptacle. Ports 40 may also include a water tight plug or cover (not shown) to prevent the ingress of water if they are not used.

If the user wants to install a peripheral device 28 at the location of receptacle 60, they would remove the cover, connect the device 28 to assembly 26 through a port 40, i.e., device 28 would have a matching male plug to the female plug in the form of port 40. Or, the device might have a female plug and the preinstalled connector 40 may be a male plug. Alternative methods may also be employed. For example both parts might have a female plug and a separate, short length of cabling with the appropriate male plugs be used to connect the device 28. The use of a standardized receptacle would allow standardized peripheral devices to be easily installed by a homeowner or unskilled labor. In the illustrated example of FIG. 6, ports 40 include a Power over Ethernet (PoE) port 40A and two USB-C ports 40B.

Additionally, a homeowner could easily upgrade an existing shower installation employing a shower panel 50A by removing cover 60 and installing a peripheral device 28 without having to access the rear of shower panel 50A. This would also allow for the convenient upgrading of a previously installed device 28 or replacement of a malfunctioning device 28 without having to access the rear of the shower panel. A sealing member, such as an elastic member around the perimeter of receptacle 60 could be employed to prevent the ingress of water into receptacle 60 when installing the device 28.

In the illustrated example, tabs 64 engage recesses 66 to removably secure cover 62 to receptacle 60 and the peripheral devices 28 could include similar tabs to secure them in place. Alternative attachment methods may also employed, e.g., threaded fasteners, interference fit engagement and other suitable methods.

Turning now to FIG. 2, this figure schematically depicts a system 20B having a plumbing fixture in the form of a sink 50B. Assembly 26 used with sink 50B advantageously includes at least one electrical power outlet 42 whereby a conventional garbage disposal, reverse osmosis device or other device requiring AC electrical current provided by a conventional residential electrical power outlet could be powered through assembly 26. In this regard, it is noted that oftentimes there will not be any type of device requiring such AC electrical current associated with an assembly 26 used with a shower panel 50A, thus, such assemblies used with shower panels 50A may typically omit outlets 42. It is also noted that while an assembly 26 used with a shower panel 50A will typically not be accessible after the initial installation of the shower panel, an assembly 26 used with a sink 50B can be mounted on the bottom side of the sink 50B and will typically be accessible after the initial installation of the sink. As a result, while it will typically be advantageous to preinstall wiring from the assembly to the point where a peripheral device 28 may be located on a shower panel during manufacture rather than, or in addition to, having ports 40 on the assembly 26, a sink-mounted assembly may advantageously include ports 40 on its housing 27 because such ports 40 will remain accessible after the initial installation of the sink 50B and associated assembly 26. Such sinks, however, may additionally or alternatively include preinstalled wiring with ports 40 located at the anticipated locations of peripheral devices 28.

In FIG. 2, the peripheral devices 28 include a faucet sensor 28G for activating/deactivating faucet. Faucet sensor 28G may be a proximity sensor or sense touching of the faucet structure or other suitable form known to those having ordinary skill in the art. Signals from sensor 28G are communicated to assembly 26 which can then control the operation of an electronic valve based upon those signals via communications router 34. Also included is a sensing device 28H for determining when a soap dispenser is empty. This type of peripheral device can be useful in commercial settings where it is useful to generate notices that a soap dispenser requires a refill. Such a notice could be routed to an external communication network through transceiver 30 of assembly 26. The faucet might also include a digitally controlled drain plug 28E. As previously mentioned, one of the peripheral devices 28 may also take the form of a garbage disposal 28I having a conventional electrical cord and plug 43 (FIG. 8) that is then plugged into an outlet 42 provided by assembly 26. When one of the peripheral devices includes a garbage disposal 28I, the sink 50B may also advantageously include a touch sensitive sensor 28J (FIG. 8) or similar switching device that can be used to energize and de-energize the power outlet 42 through which the garbage disposal receives electrical power by means of a digitally controlled switch 44 in response to signals received by communication router 34 from sensor 28J.

Sink 50B may also include a peripheral device in the form of a phone charger. For example, it may be a USB-C port 40B for charging a phone, in this regard, it is noted when a power and communication port 40 is positioned such that it is readily accessible during use of the plumbing fixture as depicted by USB-C port 40B in FIG. 8, it functions as a peripheral device 28. For example, port 40B in FIG. 8 may advantageously be a USB-C PD (Power Delivery) port that is capable of delivering up to 100 Watts of electrical power. Such USB-C PD ports adjust the power of the current in response to the device that is connected. Alternatively, the phone charger associated with the sink might be an inductive coil recharging station 28D. For example, the sink could include a relatively flat support surface generally in the plane of the countertop and upper rim of the sink for such an inductive coil recharging station. The sink might also include a digital assistant interface 28F. In this regard, it is noted the sink could also include an integral backsplash that extends vertically above the countertop in which the sink is installed and the port 40 for recharging a phone and the digital assistant interface 28F could be located in the backsplash above the plane of the countertop and upper rim of the sink.

Figure 8:
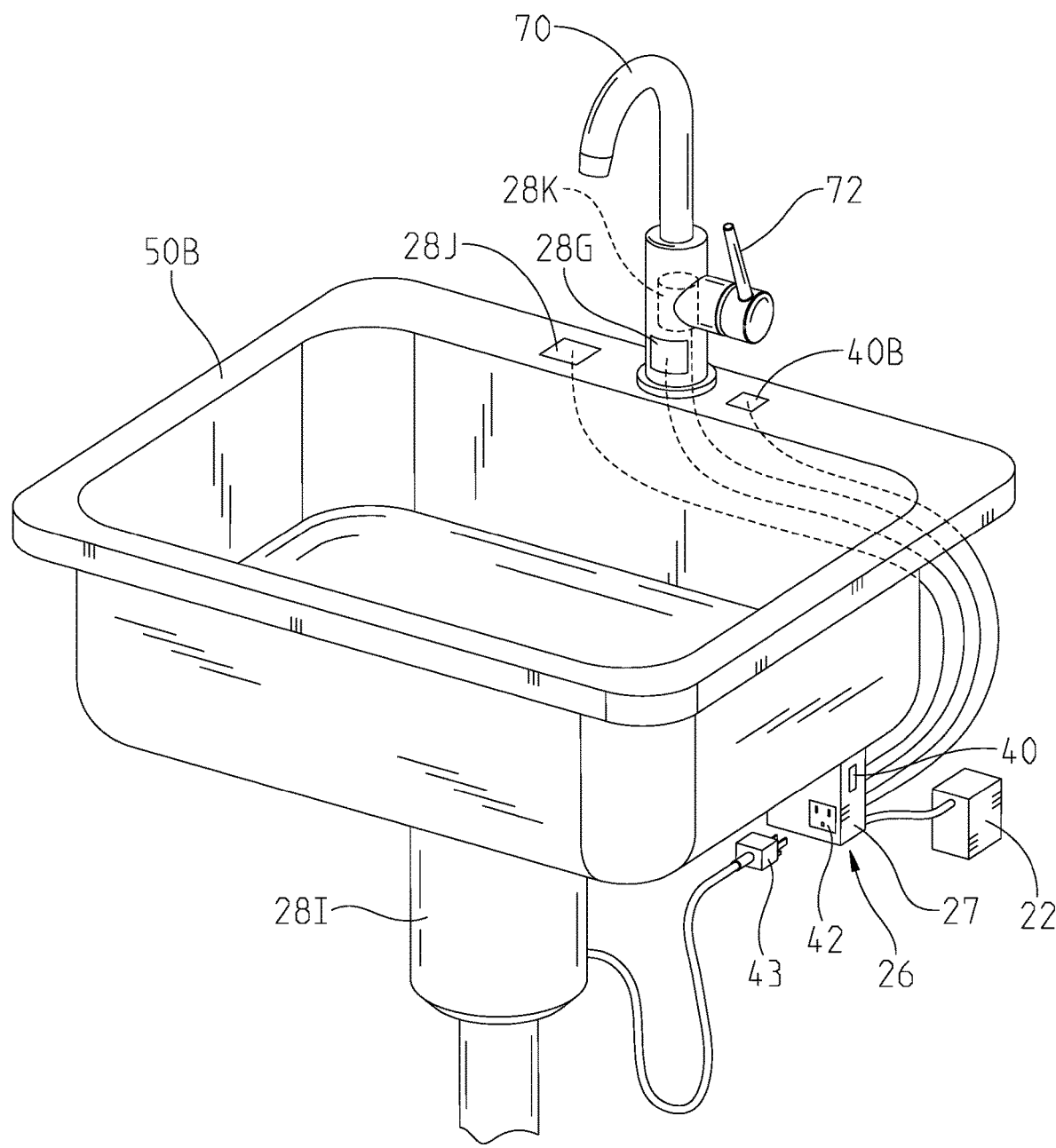
FIG. 8 is a view of a power and communication system integrated with a sink.

FIG. 8 also depicts an application wherein the plumbing fixture is a sink 50B. In the embodiment illustrated in FIG. 8, the sink 50B includes a faucet 70 having a manual control handle 72 and also an electronically controlled valve 28K. Proximity sensor 28G sends signals to assembly 26 via communication router 34 and controls signals are routed to valve 28K to open and close the valve. Manual control handle 72 may be used to override such signals and/or adjust the temperature of the water being dispensed. Various other forms of electronic faucets may also be used with assembly 26. Sensor 28J is used to activate and deactivate garbage disposal 28I. Housing 27 of assembly 26 includes a plurality of ports 40 (only one is visible in FIG. 8) whereby peripheral devices may be coupled with assembly 26 by using one of the ports 40 located on housing 27. The sink also includes a peripheral device in the form of a USB-C port 40B which is positioned near the faucet 70 at a location that will allow a user to insert a charging cable into the port to recharge their phone or other personal electronic device having a rechargeable battery or any other device capable of being powered or recharged using such a port.

Figure 3:
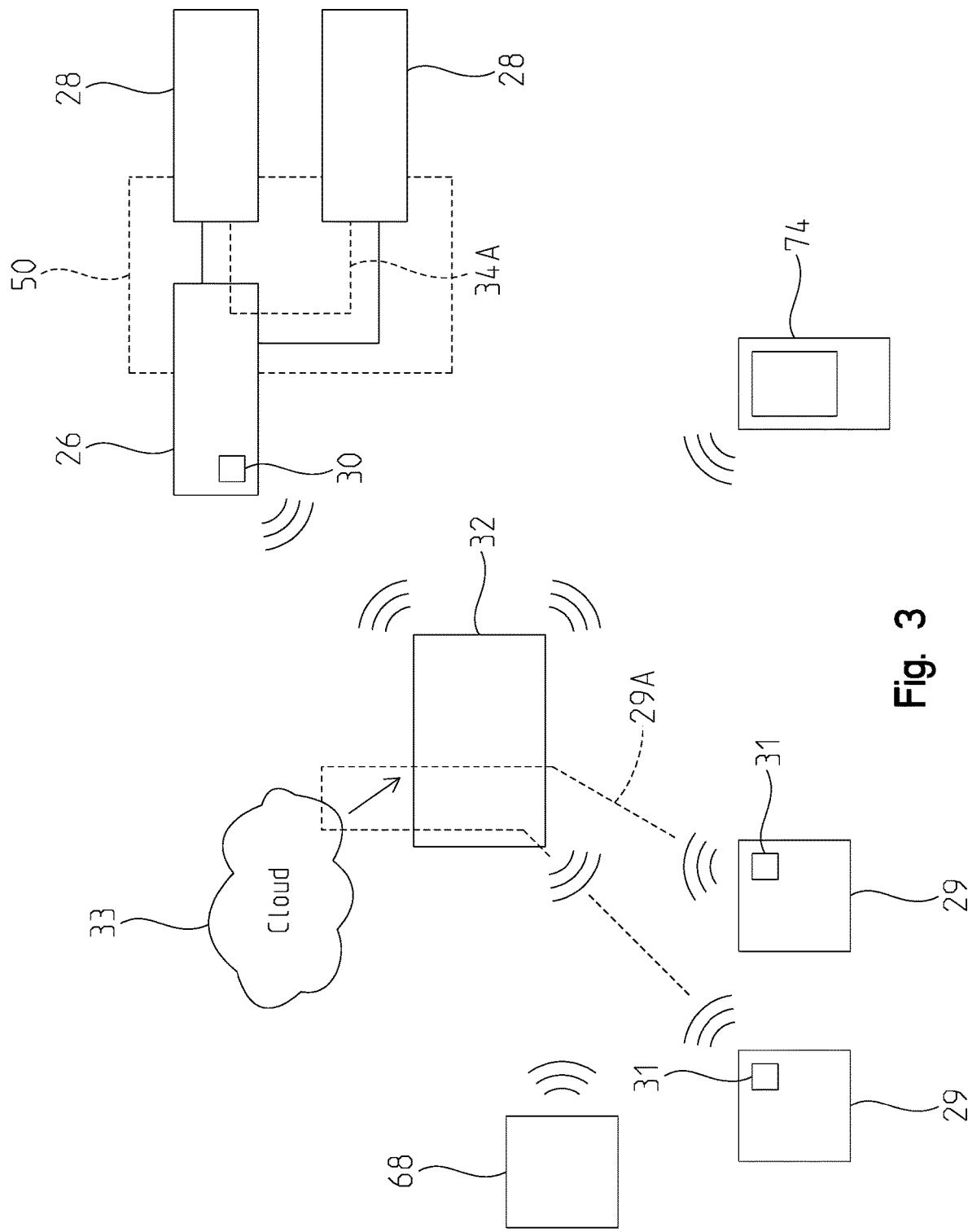
FIG. 3 is a schematic view of a power and communication system used with a plumbing fixture and other systems.

One of the advantages of the disclosed system can be readily understood with reference to FIG. 3. FIG. 3 illustrates an assembly 26 with a pair of peripheral devices 28. The connection of both devices 28 to assembly 26 allows communication router 34 to route sensor data, control signals and informational signals between the two devices 28 without having to communicate those messages through an external communication network. This efficient communication path is represented by dashed line 34A. This contrasts favorably with a communication route that is often used between conventional smart peripheral devices 29. Such conventional smart peripheral devices 29 will typically each have their own wifi module having a transceiver 31. These transceivers 31 will wirelessly communicate data between the devices 29 to an external communication network 32 such as a residential wifi system using a wireless router that is connected to the internet 33. The messages from one device 29 to the other device 29 will often be wirelessly conveyed from one device 29, to home router 32, to a cloud-based service on the internet 33, back to the home router 32 and then to the other device 29 as represented by dashed line 29A. With some conventional smart devices 29, the communication path between devices may be still further elongated and complicated by routing the messages through a conventional digital assistant 68 that wirelessly conveys messages between the devices 29 and home router 32 and which may also require that the messages be routed through two different cloud-based computing platforms.

Another advantage provided by system 20 is that the individual devices 28 can all rely on the transceiver 30 in assembly 26 when it is desirable to wirelessly communicate with an external communications network. In contrast, conventional smart peripheral devices 29 each include a separate transceiver or similar communications module thereby increasing the cost of the devices. While the ability to route communications between devices 28 without using an external communications network is advantageous, it will also oftentimes also be desirable for devices 28 to have the capability of communicating with an external communications network and transceiver 30 of assembly 26 provides that capability. As a result, it would be possible for the various devices 28 to be controlled or communicate with a conventional digital assistant 68 or a user's mobile phone 74.

Still another advantage provided by system 20 is that each of the individual devices 28 can rely on assembly 26 to provide the electrical power necessary for operation of the device 28. In contrast, conventional devices 29 will all have to have a separate way of obtaining electrical power. This aspect of system 20 provides another reduction in hardware as well as reducing the installation complexity of the system.

While this invention has been described as having an exemplary design, the present invention may be further modified within the spirit and scope of this disclosure. This application is therefore intended to cover any variations, uses, or adaptations of the invention using its general principles.

What is claimed is:

1. A power and communications system for use with an external electrical power source, the system comprising:
   a power and communication assembly, the assembly comprising:
      electrical circuitry adapted to be electrically connected with the external electrical power source and provide electrical power to the power and communication assembly, the electrical circuitry further adapted to be coupled with a plurality of peripheral devices;
      a transceiver in communication with the electrical circuitry and adapted to transmit and receive messages with an external communication network; and
      a communication router in communication with the transceiver and adapted to be communicatively coupled with the plurality of peripheral devices; and
   wherein the system further includes a plumbing fixture coupled with the power and communication assembly and adapted to be operably coupled with the plurality of peripheral devices.

2. The system of claim 1 further comprising one or more electronically controlled valves coupled with the plumbing fixture and forming one or more of the peripheral devices.

3. The system of claim 1 wherein the electrical circuitry further comprises at least one communication port in communication with the communication router, the at least one communication port being connectable with one of the plurality of peripheral devices.

4. The system of claim 1 wherein the electrical circuitry includes a plurality of power and communication ports wherein each of the plurality of power and communication ports is adapted to supply DC electrical power to a connected peripheral device and communicate electrical signals between the communication router and the connected peripheral device.

5. The system of claim 4 wherein the plurality of power and communication ports include at least one USB-C port.

6. The system of claim 4 wherein the plurality of power and communication ports include at least one Power over Ethernet (PoE) port.

7. The system of claim 4 wherein the electrical circuitry further comprises an AC power outlet adapted to supply AC electrical current to a peripheral device.

8. The system of claim 7 wherein the plumbing fixture is a sink and the AC power outlet is positioned below the sink whereby the AC power outlet is adapted to power a device coupled with the sink.

9. The system of claim 1 wherein the plumbing fixture is a sink and the electrical circuitry includes an AC power outlet positioned below the sink whereby the AC power outlet is adapted to power a device coupled with the sink.

10. The system of claim 9 wherein the electrical circuitry includes an electronically controlled switch whereby the AC power outlet is selectively energized in response to control signals communicated through the communication router.

11. The system of claim 1 wherein the plumbing fixture is a shower panel and the plurality of peripheral devices includes a user-actuated microphone mounted on the shower panel and a speaker mounted on the shower panel.

12. The system of claim 1 wherein the plumbing fixture is a shower panel and the plurality of peripheral devices includes a wireless charging pad mounted on the shower panel.

13. The system of claim 1 wherein the plumbing fixture is a shower panel and the electrical circuitry includes a plurality of power and communication ports wherein each of the plurality of power and communication ports is adapted to supply DC electrical power to a connected peripheral device and communicate electrical signals between the communication router and the connected peripheral device.

14. The system of claim 13 wherein the plurality of power and communication ports include at least one USB-C port.

15. The system of claim 13 wherein the plurality of power and communication ports include at least one Power over Ethernet (PoE) port.

16. The system of claim 1 wherein the system is capable of communicating signals between the external communication network and each of the peripheral devices through the transceiver and the communication router and the system is also capable of directly communicating signals between separate ones of the plurality of peripheral devices through the communication router.

17. A plumbing fixture adapted to be coupled with an existing electrical power source, the plumbing fixture comprising:
   electrical circuitry adapted to be electrically connected with the existing electrical power source and provide electrical power to a power and communication assembly, the electrical circuitry further adapted to provide electrical power to a plurality of peripheral devices;
   the power and communication assembly comprising:
      a transceiver adapted to transmit and receive messages with an external communication network; and
      a communication router in communication with the transceiver and adapted to be communicatively coupled with the plurality of peripheral devices.

18. The plumbing fixture of claim 17 wherein the plumbing fixture is a shower panel and the plurality of peripheral devices includes a user-actuated microphone mounted on the shower panel and a speaker mounted on the shower panel.

19. The plumbing fixture of claim 17 wherein the plumbing fixture is a shower panel and the plurality of peripheral devices includes a wireless charging pad mounted on the shower panel.

20. The plumbing fixture of claim 17 wherein and the electrical circuitry includes an AC to DC converter and a plurality of power and communication ports wherein each of the plurality of power and communication ports is adapted to supply DC electrical power to a connected peripheral device and communicate electrical signals between the communication router and the connected peripheral device.

21. The plumbing fixture of claim 20 wherein the transceiver and the communication router are disposed in a central housing and the plurality of power and communication ports are positioned remote from the central housing and wherein the electrical circuitry comprises wiring fixed to the plumbing fixture and extending between the central housing and the plurality of power and communication ports and communicating DC power and electrical signals therebetween.

22. The plumbing fixture of claim 21 wherein the power and communication assembly is capable of communicating signals between the external communication network and each of the peripheral devices through the transceiver and the communication router and the power and communication assembly is also capable of directly communicating signals between separate ones of the plurality of peripheral devices through the communication router.

23. The plumbing fixture of claim 21 wherein at least one of the plurality of power and communication ports is positioned at a mounting location of a corresponding one of the plurality of peripheral devices.

24. The plumbing fixture of claim 21 wherein each of the plurality of power and communication ports is positioned at a mounting location of a corresponding one of the plurality of peripheral devices.

25. The plumbing fixture of claim 22 wherein the plurality of peripheral devices includes at least two devices from the group consisting of an electronically controlled valve, an electronically controlled drain, an electronically controlled power switch, an automated soap dispenser, a proximity sensor, a user-actuated microphone, a speaker, and a wireless charging pad.

26. The plumbing fixture of claim 25 wherein the plurality of peripheral devices are each connected with a respective one of the plurality of power and communication ports.

27. The plumbing fixture of claim 26 wherein the plurality of power and communication ports includes at least one USB-C port.

28. The plumbing fixture of claim 26 wherein the plurality of power and communication ports include at least one Power over Ethernet (PoE) port.

29. The plumbing fixture of claim 26 wherein the plumbing fixture is a shower panel.

30. The plumbing fixture of claim 26 wherein the plumbing fixture is a sink.

31. The plumbing fixture of claim 30 wherein the electrical circuitry includes an AC power outlet positioned below the sink whereby the AC power outlet is adapted to power a device coupled with the sink.

32. The system of claim 31 wherein the electrical circuitry includes an electronically controlled switch whereby the AC power outlet is selectively energized in response to control signals communicated through the communication router.

* * * * *